Patented Mar. 20, 1923.

1,449,156

UNITED STATES PATENT OFFICE.

HERMAN F. WILLKIE, OF BALTIMORE, MARYLAND, ASSIGNOR TO U. S. INDUSTRIAL ALCOHOL CO., A CORPORATION OF WEST VIRGINIA.

SOLVENT COMPOSITION.

No Drawing.   Application filed April 14, 1922.   Serial No. 552,633.

*To all whom it may concern:*

Be it known that I, HERMAN F. WILLKIE, a citizen of the United States, a resident of Baltimore and State of Maryland, have invented certain new and useful Improvements in Solvent Compositions, of which the following is a specification.

My invention relates especially to solvent compositions which are designed for the production of clear coatings or films when used to dissolve cellulose esters, such, for example, as pyroxylin.

The object of my invention is to provide a solvent composition adapted to be used with cellulose esters, such as cellulose nitrates or cellulose acetate, but more particularly pyroxylin, so as to obtain coating compounds which will produce clear coatings or films under varying atmospheric and weather conditions.

Heretofore, it has been difficult to produce invariably clear films from coating compositions containing cellulose esters when there was a high degree of humidity in the atmosphere as the presence of the large amount of moisture in the atmosphere tended to bring about blushing in the coatings.

The object of my invention is, particularly, to avoid this difficulty by using as a constituent of the composition a very high boiling solvent, which is, nevertheless, a good solvent of the cellulose ester, and which will not only act as a direct solvent thereof but serve also as a latent solvent of the same. This result is attained by reason of the fact that some of the said very high boiling solvent will remain in the film as a gelatinizer of the cellulose ester after the volatile solvents and the water present have completely evaporated therefrom so as to form a dry hard mass with the cellulose ester from which all the volatile constituents will have had an opportunity to evaporate before the hardening has taken place. The object of my invention is, furthermore, particularly, to use as such high boiling solvent, diethyl phthalate, a substance which is stable and substantially odorless, and has a boiling point of from 290 to 294° C. I have found, however, that in using a solvent having such a very high boiling point it is important to provide therewith not only a volatile solvent but, in addition, a constituent which will form a ternary or quaternary constant boiling mixture with the diethyl phthalate, water and volatile solvent so as to completely remove the water from all portions of the deposited film before the latter sets into a hard mass and more quickly than the water would evaporate alone from the composition were such additional constituent not present. Otherwise the water would be retained to such an extent in some portions of the film as to produce an uneven whitish appearance. The preferred constituent which I use for this purpose is benzol and the other constituents of the mixture should be of such a nature as to be capable of withstanding high dilution with a diluent, such as benzol. Furthermore, preferably, the volatile solvent should be of such a character as to dehydrate the cellulose ester and thus assist in this way in the removal of water. For this reason I prefer to use ethyl acetate as the volatile solvent.

As a preferred embodiment of my invention I may provide a composition comprising 3¾ parts by volume of diethyl phthalate, 11¼ parts by volume of a volatile solvent, such as ethyl acetate, and 25 parts by volume of benzol, such as motor benzol.

These percentages may vary widely as, for example, shown in the various compositions in the following table, the numbers denoting parts by volume:

| Ethyl phthalate. | Ethyl acetate. | Motor benzol. | Alcohol (95%). |
|---|---|---|---|
| 2½ | 47½ | 50 |  |
| 7½ | 67½ |  | 25 |
| 7½ | 67½ | 25 |  |
| 5 | 45 | 50 |  |
| 2½ | 22½ | 75 |  |
| 11¼ | 63¾ |  | 25 |
| 7½ | 42½ |  | 50 |
| 3¾ | 21¼ |  | 75 |
| 11¼ | 63¾ | 25 |  |
| 7½ | 42½ | 50 |  |

| Ethyl phthalate. | Motor benzol. | Absolute alcohol. |
|---|---|---|
| 3¾ | 25 | 71¼ |
| 7½ | 25 | 67½ |
| 5 | 50 | 45 |
| 11¼ | 25 | 63¾ |
| 7½ | 50 | 42½ |

Other similar very high boiling solvents, by which term is meant solvents boiling above 150° C., may be used instead of or together with the diethyl phthalate, as, for example, ethyl aceto acetate, triacetin, ethyl succinate or dimethyl phthalate.

Also, various other volatile solvents may be used instead of or in addition to the ethyl acetate, and for this purpose any of the known volatile solvents of the cellulose esters which would form such ternary or quaternary constant boiling mixtures may be used, as, for example, acetone.

Furthermore, instead of the benzol, other liquids to form such ternary or quaternary constant boiling mixture, may be used, as for example, toluol.

The water which enters into the above composition may be water that is present in the pyroxylin or taken up from the air by the ethyl acetate during the formation of the film or which may have been brought into the composition in any other way.

Various other changes may be made in the compositions referred to in accordance with the spirit of my invention and within the scope of the appended claims.

I claim:

1. A solvent composition comprising a very high boiling solvent of a cellulose ester, a volatile solvent thereof, and a third liquid having the characteristic of forming a ternary or quaternary constant boiling mixture with water and said solvents.

2. A solvent composition comprising a solvent which is both a direct and a latent solvent of a cellulose ester, a volatile solvent thereof and a third liquid having the characteristic of forming a ternary or quaternary constant boiling mixture with water and said solvents.

3. A solvent composition comprising diethyl phthalate a volatile solvent of a cellulose ester, and a third liquid having the characteristic of forming a ternary or quaternary constant boiling mixture with water, diethyl phthalate and said volatile solvent.

4. A solvent composition comprising of a very high boiling solvent of a cellulose ester, a volatile solvent thereof and benzol, said solvents forming a ternary or quaternary constant boiling mixture with water and benzol.

5. A solvent composition comprising a solvent which is both a direct and a latent solvent of a cellulose ester, a volatile solvent thereof and benzol, said solvents forming a ternary or quaternary constant boiling mixture with water and benzol.

6. A solvent composition comprising diethyl phthalate, a volatile solvent of a cellulose ester and benzol, said solvents forming a ternary or quaternary constant boiling mixture with water, benzol, and diethyl phthalate.

7. A solvent composition comprising a very high boiling solvent of a cellulose ester, ethyl acetate, and a third liquid having the characteristic of forming a ternary or quaternary constant boiling mixture with water and said solvents.

8. A solvent composition comprising a solvent which is both a direct and a latent solvent of a cellulose ester, ethyl acetate, and a third liquid having the characteristic of forming a ternary or quaternary constant boiling mixture with water and said solvents.

9. A solvent composition comprising diethyl phthalate, ethyl acetate and a third liquid having the characteristic of forming a ternary or quaternary constant boiling mixture with water, diethyl phthalate and ethyl acetate.

10. A solvent composition comprising a very high boiling solvent of a cellulose ester, ethyl acetate, and benzol, said solvent forming a ternary or quaternary constant boiling mixture with water, benzol, and ethly acetate.

11. A solvent composition comprising a solvent which is both a direct and a latent solvent of a cellulose ester, ethyl acetate, and benzol, said solvent forming a ternary or quaternary constant boiling mixture with water, benzol, and ethyl acetate.

12. A solvent composition comprising diethyl phthalate, ethyl acetate and benzol.

13. A composition comprising pyroxylin, a very high boiling solvent of pyroxylin, ethyl acetate, and a third liquid having the characteristic of forming a ternary or quaternary constant boiling mixture with water and said solvents.

14. A composition comprising pyroxylin, a solvent which is both a direct and a latent solvent of pyroxylin, ethyl acetate, and a third liquid having the characteristic of forming a ternary or quaternary constant boiling mixture with water and said solvents.

15. A composition comprising pyroxylin, diethyl phthalate, ethyl acetate, and a third liquid having the characteristic of forming a ternary or quaternary constant boiling mixture with water, diethyl phthalate and ethyl acetate.

16. A composition comprising pyroxylin, a very high boiling solvent of pyroxylin, ethyl acetate, and benzol, said solvent forming a ternary or quaternary constant boiling mixture with water, benzol, and ethyl acetate.

17. A composition comprising pyroxylin, a solvent which is both a direct and a latent solvent of pyroxylin, ethyl acetate, and benzol, said solvent forming a ternary or quaternary constant boiling mixture with water, benzol, and ethyl acetate.

18. A composition comprising pyroxylin, diethyl phthalate, ethyl acetate and benzol.

19. A composition comprising a cellulose ester, a very high boiling solvent thereof, a volatile solvent thereof, and a third liquid having the characteristic of forming a ternary or quaternary constant boiling mixture with water and said solvent.

20. A composition comprising a cellulose ester, diethyl phthalate, a volatile solvent thereof, and a third liquid having the characteristic of forming a ternary or quaternary constant boiling mixture with water, diethyl phthalate, and said solvent.

21. A composition comprising a cellulose ester, diethyl phthalate, ethyl acetate, and a third liquid having the characteristic of forming a ternary or quaternary constant boiling mixture with water, diethyl phthalate, and ethyl acetate.

In testimony that I claim the foregoing, I have hereunto set my hand this 14th day of March, 1922.

HERMAN F. WILLKIE.